United States Patent [19]

Shimp et al.

[11] 4,304,700

[45] Dec. 8, 1981

[54] TWO COMPONENT AQUEOUS BASED COATING COMPOSITION

[75] Inventors: David A. Shimp, Prospect; Darrell D. Hicks, Jeffersontown; Richard B. Graver, Louisville, all of Ky.

[73] Assignee: Celanese Corporation, New York, N.Y.

[21] Appl. No.: 191,786

[22] Filed: Sep. 29, 1980

Related U.S. Application Data

[63] Continuation of Ser. No. 69,969, Aug. 27, 1979, abandoned.

[51] Int. Cl.$^3$ .............................................. C08L 63/02
[52] U.S. Cl. .................. 260/29.2 EP; 260/18 EP; 428/418; 525/526
[58] Field of Search ............... 260/29.2 EP, 18 EP; 525/526

[56] References Cited

U.S. PATENT DOCUMENTS

| | | | |
|---|---|---|---|
| 2,643,239 | 6/1953 | Shokal et al. | 260/42 |
| 2,651,589 | 9/1953 | Shokal et al. | 154/140 |
| 2,909,448 | 10/1959 | Schroeder | 117/141 |
| 3,336,253 | 8/1967 | Wong et al. | 260/29.2 |
| 3,449,281 | 6/1969 | Sullivan et al. | 260/292 |
| 3,719,626 | 3/1973 | May | 260/29.2 EP |
| 4,064,090 | 12/1977 | Gibson et al. | 260/29.4 R |
| 4,089,826 | 5/1978 | Moss et al. | 260/29.2 EP |
| 4,116,900 | 9/1978 | Belanger | 260/18 EP |

FOREIGN PATENT DOCUMENTS

| | | |
|---|---|---|
| 884929 | 11/1971 | Canada . |
| 2549656 | 5/1976 | Fed. Rep. of Germany . |
| 1222810 | 8/1968 | United Kingdom . |
| 1131543 | 10/1968 | United Kingdom . |
| 1242783 | 8/1971 | United Kingdom . |
| 1326435 | 8/1973 | United Kingdom . |

*Primary Examiner*—Theodore E. Pertilla
*Attorney, Agent, or Firm*—Herbert P. Price; T. J. Morgan

[57] ABSTRACT

The present invention provides a two component resin coating system which when mixed forms a curable coating composition. The first component comprises a polyamine terminated polyepoxide adduct which has been salted with a controlled amount of acid. The salted product is dissolved in a co-solvent having a specifically defined solubility parameter polar component and water. The second component comprises a low molecular weight water insoluble polyepoxide crosslinker which is optionally dissolved in the selected co-solvent. When the two-components are blended together, the polyepoxide resin crosslinker is dispersed in the microemulsified state throughout the salted adduct solution and the resulting composition exhibits improved pot life, freeze thaw stability, and film forming properties.

13 Claims, No Drawings

TWO COMPONENT AQUEOUS BASED COATING COMPOSITION

This is a continuation of application Ser. No. 069,969, filed Aug. 27, 1979, now abandoned.

BACKGROUND OF THE INVENTION

The field to which this invention pertains is curable compositions based on mixtures of epoxy-amine adducts and epoxy resins, particularly aqueous compositions wherein the epoxy resin is microemulsified in an aqueous solution of an acid salt of the epoxy-amine adduct.

Coating compositions based on organic solvent solutions of polyepoxide resins have been used successfully for a number of years. Such compositions have been particularly useful for coating the interior and exterior of food and beverage containers.

Due to increasing problems with air pollution, considerable efforts are being expended to convert organic solvent containing coating compositions to water based systems, i.e., coating systems based on solutions, dispersions and emulsions of film forming resins in water. One of the problems in the use of such aqueous systems is the inability of the resin to properly wet the substrate and to form a continuous coating. Another problem is the poor resistance properties, e.g., hot water resistance, of the cured coatings. Still other problems are the mechanical stability, e.g., particle settling, freeze-thaw stability and shear sensitivity, and chemical stability, e.g., pot-life, of aqueous coating systems.

Due to present and potential world-wide energy shortages, considerable effort is being expended to develop coating compositions which can be baked and cured rapidly at low temperatures, e.g., at 200° to 300° F.

It is therefore an object of the present invention to provide a two component aqueous based coating system wherein when the components are mixed forms a curable coating composition having improved mechanical and chemical stability and which when applied as a film exhibits improved particle coalescence, film continuity, adhesion, flexibility, chip resistance and the like.

It is a further object of the present invention to provide a coating composition capable of being cured with low energy input, i.e., a coating composition which can be cured at low temperatures in a relatively short time.

A still further object of the present invention is to provide a process for preparing the curable coating composition.

These and other objects and features of the invention will become apparent from the claims and from the following description.

SUMMARY OF THE INVENTION

In one aspect this invention relates to curable coating compositions made from aqueous microemulsions. In particular, this invention pertains to a two component coating composition wherein one component is an acid salt of a polyepoxide-amine adduct and the other component is a water insoluble polyepoxide. More particularly, this invention relates to a microemulsion made from an acid salt of a polyepoxide-polyamine adduct dissolved in water and an organic co-solvent having dispersed therein in microemulsified form a water insoluble polyepoxide. In another aspect this invention is directed to a process for preparing a curable coating composition.

The curable coating composition of this invention is a two component system which when mixed forms a microemulsion wherein the first component as described hereinafter is the continuous phase and the second component is the discontinuous phase. The first component is the solution of (1) an acid salt of a polyamine terminated polyepoxide resin which is the reaction product of (a) a polyepoxide resin represented by the structural formula:

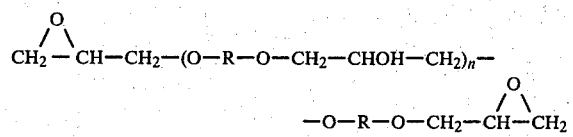

wherein R is a divalent hydrocarbon radical of a dihydric phenol and the average value of n is from about 8 to about 20 and (b) a polyamine having at least two amine nitrogen atoms per molecule, at least three reactive amine hydrogen atoms per molecule and no other groups reactive with epoxide groups, wherein about one mol of (b) is reacted with each epoxide equivalent of (a). The resulting polyepoxide-amine adduct has an active amine hydrogen equivalent weight of about 290 to about 1000 and an amine nitrogen equivalent weight of about 360 to about 1500. This polyepoxide-polyamine adduct is salted with a volatile acid and is dissolved in at least one organic aliphatic hydroxyl containing co-solvent and water. The co-solvent has a solubility parameter polar component between about 2.6 and about 3.9 $(cal/cm^3)^{\frac{1}{2}}$ and is present in an amount of about 5 to about 45% by weight based on the weight of the polyepoxide-polyamine adduct and co-solvent. The water is present in an amount sufficient to bring the solids content of the mixture to below 40% by weight, based on the weight of adduct, co-solvent and water.

The second component, which is dispersed in the first component in the microemulsified state, is a polyepoxide cross-linker which is a glycidyl polyether of a polyhydric phenol having an epoxide equivalent weight of about 150 to about 500. Optionally, this second component can be dissolved in the organic aliphatic hydroxyl containing co-solvent described hereinbefore. The first component and the second component are present in such amounts that the epoxide group to active amine hydrogen ratio is from about 0.25:1 to about 1.5:1.

DESCRIPTION OF THE INVENTION

FIRST COMPONENT

The polyamine terminated polyepoxide adduct of the first component is the reaction product of a polyamine with a polyepoxide resin.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic or cycloaliphatic and contain at least 2 carbon atoms per molecule. Useful polyamines contain about 2 to about 6 amine nitrogen atoms, 3 to about 8 amine hydrogen atoms, and 2 to about 20 carbon atoms per molecule. Examples of such amines are the alkylene polyamines, such as ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, 1,4-diaminocyclohexane, methyl-amino-propylamine, and the like. Preferred amines for use in this invention are alkylene polyamines of the formula:

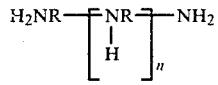

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being ethylene diamine, diethylene triamine and triethylene tetramine.

The polyepoxide resins useful in preparing the adduct include glycidyl polyethers of polyhydric phenols and contain more than one 1,2-epoxide groups per molecule. Such polyepoxide resins are derived from an epihalohydrin and a dihydric phenol and have an epoxide equivalent weight of about 1200 to about 3000. Examples of epihalohydrins are epichlorohydrin, epibromohydrin and epiiodohydrin with epichlorohydrin being preferred. Dihydric phenols are exemplified by resorcinol, hydroquinone, p,p-dihydroxydiphenylpropane (or Bisphenol A as it is commonly called), p,p'-dihydroxybenzophenone, p,p'-dihydroxydiphenyl methane, p,p'-dihydroxydiphenylethane, bis(2-hydroxynaphthyl)methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide. The polyepoxide resins can be represented by the general formula:

group with an amine group, can be represented by the formula:

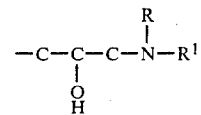

wherein R is an alkylene amine group or hydrogen and $R^1$ is an alkylene amine group.

In preparing the adducts of this invention, the polyepoxide resin and the polyamine are reacted under such conditions that the adduct so formed contains about 1 mole of adduct polyamine molecule for each epoxide equivalent originally present in the polyepoxide resin. This polyamine-polyepoxide resin adducting reaction is carried out using about 1 to about 10 moles of polyamine for each epoxide equivalent of the polyepoxide resin. When the reaction is completed, i.e., when all the epoxide groups have reacted, as much of the excess unreacted polyamine as possible is removed. The reaction can also be conducted by reacting the primary amine groups of polyalkylene polyamines, e.g., diethylene triamine, with a ketone to form a ketimine, adducting the secondary amine groups with the polyepoxide resin and then hydrolyzing the ketimine groups to the primary amine groups.

The preparation of adducts of polyepoxide resins and polyamines is described in detail in U.S. Pat. Nos. 4,093,594 and 4,116,900 which are hereby incorporated by reference. Adduct formation by ketimine reaction is described in U.S. Pat. No. 3,947,339 which is also incorporated by reference. When the adducting reaction is completed, unreacted amine, if any, is removed by vacuum distillation or by steam sparging under vacuum distillation at temperatures of not greater than about 400° F. If temperatures in excess of 400° F. are employed, the adduct will discolor. Steam sparging is conducted in a manner sufficient to reduce the presence

wherein R is a divalent hydrocarbon radical of a dihydric phenol and n is an integer. While for any single molecule of the polyether, n is an integer, the obtained polyether is a mixture of compounds and the determined value for n constitutes an average which is not necessarily a whole number. Thus, the average value of n of the polyepoxide employed to prepare the adduct is not less than 8 and can vary from about 8 to about 20, and preferably from about 8 to about 12. If the average value for n is less than about 8 the chemical stability (pot life) of the microemulsion which forms upon mixing components 1 and 2 is substantially reduced along with the physical and chemical properties of the resulting cured coating prepared therefrom.

The resulting adduct of the polyamine and polyepoxide can be represented by the formula:

wherein A represents a reacted polyepoxide resin and B represents a reacted polyamine. In this formula, the A-B linkage, which is formed by the reaction of an epoxide of unreacted amine in the adduct to an amount not greater than about 0.5%, by weight, based on the weight of the adduct. If unreacted amine is present in amounts greater than about 0.5%, the pot life of the microemulsion will be reduced substantially and films prepared from the compositions after curing may have poor water resistance.

The amine nitrogen equivalent weight of the polyepoxide-polyamine adduct is controlled to be not less than about 290, preferably from about 360 to about 1500, and most preferably from about 475 to about 1000.

The amine hydrogen equivalent weight of the polyepoxide-polyamine adduct will vary from about 290 to about 1000 and preferably from about 350 to about 650.

Co-solvent is added to the polyepoxide-polyamine adduct after removal of the reaction medium and unreacted amine. The co-solvent is added in an amount sufficient to achieve a concentration of from about 5 to about 45%, preferably from about 25 to about 40%, by weight, based on the weight of the adduct and co-solvent. The identity of the co-solvent is described hereinafter.

After addition of the co-solvent the epoxy-amine adduct must be converted to its corresponding acid salt by reaction with acid. Preferably the acid is added after the addition of the co-solvent.

The degree of salting of the epoxy-amine adduct is herein defined to be the number of equivalents of acid reacted with the total number of amine nitrogen equivalents of the epoxy-amine adduct expressed as a percentage of the total number of amine nitrogen equivalents on the adduct. Thus, a 100% degree of salting indicates that the epoxy-amine adduct has been reacted with sufficient acid to convert 100% of the amine nitrogen atoms present in the adduct to the corresponding salt.

To convert the epoxy-amine adduct to its corresponding salt for use in the present invention, it is required to react the adduct with sufficient acid to achieve a degree of salting of at least about 80%, and preferably from about 100 to about 300%, and most preferably from about 100 to about 200%. The effect of salting is to render the epoxy-amine adduct soluble in water or at least water dispersible in a microemulsified state. The use of a high percentage of acid, particularly excess acid, helps to lengthen the pot life of the final composition. However, this benefit of longer pot life is achieved at the sacrifice of room temperature curing capability. Since elevated temperature cures are normally employed in industrial applications, the improvement in pot life is more desirable than a room temperature cure. Thus, the pH of the first component containing the salted epoxy-amine adduct is controlled to be below 7, preferably from about 4 to about 6, and most preferably from about 5 to about 6.

Ordinarily one would expect the excess acid to react with the epoxide groups of the epoxy crosslinker when added, thereby reducing the potential of the crosslinker to react with the epoxy-amine adduct. However, it is an unexpected discovery of the present invention that this does not happen in the system described herein.

As described above the epoxy-amine adduct is converted to its corresponding salt by mixing with a volatile organic or inorganic acid. The volatile organic acids may be aliphatic, cycloaliphatic, or heterocyclic and may be saturated or unsaturated. Representative examples of volatile organic acids include acetic acid, formic acid, propionic acid, butyric acid, acrylic acid, methacrylic acid, and cyclohexanoic acid. The organic acid will preferably be an aliphatic mono carboxylic acid having up to 3 carbon atoms.

Representative examples of water soluble inorganic acids include hydrochloric acid, hydrobromic acid and the like.

The preferred acid is glacial acetic acid.

The epoxy-amine adduct salt and co-solvent are then diluted with water to achieve a total solids content of from about 15 to about 50%, and preferably from about 20 to about 35% by weight, based on the weight of adduct, co-solvent and water.

SECOND COMPONENT

The second component of the two component coating system is a low molecular weight water insoluble polyepoxide cross-linker having more than one terminal epoxide group. Such polyepoxides are the glycidyl polyethers of polyhydric phenols having an epoxide equivalent weight of about 150 to about 500 and preferably about 180 to about 250.

These polyepoxide crosslinkers include glycidyl polyethers of dihydric phenols made by reacting a dihydric phenol with an epihalohydrin. Examples of such dihydric phenols are p,p'-dihydroxydiphenyl propane (or Bisphenol A as it is commonly called), p,p'-dihydroxybenzophenone, p,p'-dihydroxydiphenyl methane, p,p'-dihydroxydiphenylethane, bis(2-hydroxynaphthyl)methane, 1,5-dihydroxynaphthalene and the like. Bisphenol A is the preferred dihydric phenol. The epoxide equivalent weight of these polyepoxide crosslinkers will vary from about 170 to about 500, and preferably from about 180 to about 250.

Other suitable polyepoxide crosslinkers are glycidyl polyethers of novolac resins. Novolac resins are phenolic resins obtained by condensing phenol with formaldehyde under acidic conditions and at formaldehyde-phenol molar ratios of 0.5 to 0.8. The corresponding polyepoxides are obtained by reacting an epihalohydrin with the novolac resin. The epoxide equivalent weight of the novolac epoxy resins will vary from about 150 to 300 and preferably from about 170 to 210.

The epoxy crosslinker is preferably mixed with an appropriate co-solvent as defined herein to reduce its viscosity and prepare it for mixing with the epoxy-amine adduct although the crosslinker may be added directly to the first component if desired.

The co-solvent when added to the crosslinker will typically be present in the second component in an amount which can vary from about 0 to about 30%, and preferably from about 10 to about 20%, by weight based, on the weight of co-solvent and epoxy crosslinker.

The co-solvent which is employed in the present invention in either component is herein defined to be an organic aliphatic hydroxyl containing solvent which is characterized as possessing a specifically defined solubility parameter polar component ($\delta_p$) in units of $(cal/cm^3)^{\frac{1}{2}}$ of from about 2.6 to about 3.9 and preferably from about 2.8 to about 3.6. The organic aliphatic hydroxyl containing solvent is referred to herein as a co-solvent because it is partially water soluble and therefore serves as a bridge between the water soluble phase (i.e., the salted epoxy-amine adduct) and the water insoluble phase (i.e., the epoxy crosslinker) of the coating composition.

The solubility parameter polar component of a solvent is determined from the following equation:

$$\delta_p = \sqrt{\frac{12108\,(\epsilon - 1)}{v_m^2\, 2 + n_D}\, (n_D + 2)\, u^3\, \frac{cal}{cm^3}}$$

wherein $\epsilon$ = dielectric constant, static value, of the co-solvent;

$n_D$ = the index of refraction for the sodium-D line of the co-solvent;

u = dipole moment, Debyes of the co-solvent;

$V_m$ = molar volumn($cm^3$) of the co-solvent.

For a further discussion of polar solubility parameters see M. Hansen and K. Skaarup; *Independent calculation of The Parameter Components* 39 Journal of Paint Technology No. 511 (1967), the disclosure of which is herein incorporated by reference.

Thus, any organic aliphatic hydroxyl containing co-solvent having a solubility parameter polar component within the above ranges may be employed in preparing the two component coating system described herein. Typical co-solvents are alcohols and glycol ethers.

In addition to the hydroxyl containing co-solvents, minor amounts of other solvents, e.g., other alcohols, glycol-ethers, ketones, organic carbonates, aromatic hydrocarbons, cyclic ethers and the like, can be included in a co-solvent blend, providing the polar solubility parameters of the blend meet the aforestated range.

Representative examples of suitable alcohols and their associated polar solubility parameters in (cal/cm$^3$)$^{\frac{1}{2}}$ include n-propanol (3.3) and n-butanol (2.8).

Representative examples of suitable glycol ethers and their associated polar solubility parameters include ethylene glycol monopropylether (3.6); diethylene glycol monobutyl ether (3.4); and ethylene glycol monobutyl ether (3.1).

In preparing the two component coating composition of the subject invention it is preferred to employ a mixture of co-solvents. Such mixtures should contain (1) a low boiling co-solvent, i.e., b.p. less than about 160° C., primarily to lower the surface tension of the coating composition, and (2) a high boiling co-solvent, i.e., b.p. greater than about 160° C., primarily to aid in the coalescence of a glossy film.

When the two components described above have been properly prepared, they are mixed together with simple stirring. Immediately, upon mixing, the mixture becomes opaque, creamy and viscous. However, within about two minutes with continuous stirring, the mixture becomes translucent or transparent as a microemulsion forms.

The term microemulsion as employed herein defines certain colloidal solutions which have the appearance of true solutions but which exhibit the light scattering Tyndall beam effect. Microemulsions also encompass hazy and cloudy dispersions which exhibit opalescence, indicating that at least a portion of the particles have a particle size of less than 0.14 microns. Without wishing to be bound by any particular theory, it is believed that the polar portion of the co-solvent is oriented towards the continuous aqueous phase while the non-polar portion of the co-solvent is oriented towards the discontinuous non-polar phase (the epoxy crosslinker) to form micelles. The formation of the micelles is aided by the salted epoxy-amine adduct which functions as a surfactant. The particle size of the epoxy crosslinker as dispersed in the form of an oil-in-water type microemulsion is less than about 0.14 microns.

When the two components are mixed, the resultant viscosity is usually greater than that of either component due to microemulsion formation. It is normal practice to thin the mixture with water to the desired viscosity for application. Optionally, co-solvent can be used in conjunction with water for viscosity adjustment.

Thus, the total amount of co-solvent employed in the coating composition after mixture of the two components is controlled to be at least 15%, typically from about 20 to about 45%, and preferably from about 25 to about 40% by weight, based on the weight of the adduct, crosslinker, and co-solvent, by the addition of further co-solvent if needed.

The solids content of the coating composition obtained by mixing of components I and II, and after the optional addition of further co-solvent, is controlled, by dilution with water, to be from about 5 to about 40%, preferably from about 20 to about 30%, by weight based on the weight of the composition, i.e., adduct, crosslinker, co-solvent, and water.

The amount of epoxy crosslinker which is present in the coating composition is most preferably sufficient to achieve substantially stoichiometric equivalence with the reactive amino hydrogens on the epoxy-amine adduct. In general, it is preferred to employ the epoxy crosslinker in an amount sufficient to achieve an epoxy to reactive adduct amine equivalent weight ratio of from about 0.25:1.00 to about 1.5:1.0, and preferably from about 0.8:1.0 to about 1.2:1.0. When employing these amounts of crosslinker the weight ratio of epoxy amine adduct to crosslinker will vary from about 24:1 to about 0.33:1, preferably from about 3.5:1 to about 1:1, and most preferably from about 3.2:1 to about 1.5:1.

When components I and II are mixed, the resulting coating composition exhibits a pot life at room temperature of from about 0.5 to about 30 days, typically from about 1 to about 7 days.

The pot life of the coating composition is herein defined to be the lapsed time from mixing the components together until the resulting composition is no longer suitable for application by spray or roll coating techniques to a substrate or until the cured coating no longer possesses film continuity, adhesion and blush resistance. The suitability for application by spraying or roll coating techniques can be expressed in terms of the viscosity and the homogeneity of the coating composition. Thus, the pot life can be characterized as the lapsed time from mixing the two components to the time when the viscosity of coating compositions increases above U as determined by the Gardner-Holdt method at 25° C. or develops sediment or stratification. Typically the viscosity of the coating composition will increase until the microemulsion either breaks, in which case the crosslinker settles into a separate layer accompanied by a substantial reduction in viscosity, or until crosslinking reactions takes place accompanied by a substantial increase in viscosity.

The coating composition of the present invention is preferably employed as a can coating. Typical metals from which the cans can be made and to which the coating composition can be applied include tin plated steel, passivated steel and aluminum.

The coating composition can be applied to the metal surface of the can by any spraying technique typically employed in the art.

Alternatively, the coating composition can be applied to a continuous metal sheet, from which the bottoms and tops of the cans are stamped out, by a doctor blade or roller coater.

The curing temperatures of the coating compositions can vary depending on the degree of salting, cure time and coating thickness. Typically, at a degree of salting of from about 100 to about 200% and a cure time of about 0.5 to about 8 minutes, the curing temperatures can vary from about 150° to about 400° F., preferably from about 200° to about 300° F.

In order to be acceptable as a can coating, the coating composition must withstand certain standard tests such as water (blush) resistance, wet adhesion, degree of cure (solvent resistance) and coating continuity.

The invention is additionally illustrated in connection with the following Examples which are to be considered as illustrative of the present invention. It should be understood, however, that the invention is not limited to the specific details of the Examples. All parts and percentages in the Examples and in the remainder of the specification are by weight unless otherwise specified.

EXAMPLE I

Part A

To a suitable reactor were added 1600 parts of the diglycidyl ether of Bisphenol A having an epoxide equivalent weight (WPE) of 190. Stirring and heat were applied raising the temperature to 70° C. Bisphenol A, 800 parts, was added followed by the addition of 3.28 parts of triphenyl phosphine. Heating was continued, and when the temperature reached 130° C., the heating source was removed. The exothermic reaction carried the temperature to 160° C. The temperature was maintained at 160° C. until the exothermic reaction was completed. The temperature was then raised to 180° C. and maintained thereat for two hours. The resulting resinous epoxy resin has an average value of $n=10$, and had an epoxide equivalent weight of 1560.

Part B

Preparation of Epoxy-amine Adduct

To a suitable reactor were added 300 parts of the epoxy resin prepared in Part A and 250 parts of toluene. Heating and stirring were applied to dissolve the resin in the solvent. After solution was attained and with the temperature at 70° C., 64 parts of ethylene diamine were added. The temperature was held at 65°–70° C. for one hour, followed by heating to 100° C. and holding at this temperature for one hour. The reactor was then fitted for distillation and heat was applied raising the temperature to 180° C. while distilling solvent and excess ethylene diamine. After the temperature reached 180° C., a vacuum of 28.5 inches of Hg was applied, the temperature was brought back to 180° C. and was held at this temperature for 15 minutes. The vacuum was then released, the heat source was removed and the reactor was fitted with a reflux condenser. The mono-n-propyl ether of propylene glycol 82.8 parts, by weight, was added to the resulting adduct followed by the addition of 82.8 parts, by weight, of n-butanol and 41.4 parts, by weight, of methylethyl ketone. Stirring was continued until solution was obtained. The calculated molecular weight of the adduct was about 3240, the amine nitrogen equivalent weight was 810 and the amine hydrogen equivalent weight was 540 based on adduct solids. The weight weighted average of the polar solubility parameters of the co-solvents was 3.4 $(cal/cm^3)^{\frac{1}{2}}$.

Part C

Preparation of Adduct Salt

To a suitable reactor were added 60 parts of the epoxy-amine adduct solution described in Part B. 2.46 parts of glacial acetic acid were then added with stirring to achieve a degree of salting of 100% followed by slow addition of 81.54 parts of deionized water. Stirring was continued until solution was attained. The resulting aqueous solution had a solids content of 25%, a Gardner-Holdt viscosity at 25° C. of G, and a pH of 5.9.

PART D

Preparation of Microemulsion 30 parts of the aqueous solution described in Part C were mixed with 3.1 parts of a solution of the diglycidyl ether of Bisphenol A, having an epoxide equivalent weight of 190, dissolved in the mono-n-butyl ether of ethylene glycol, wherein the weight ratio of epoxide resin to co-solvent is 87:13. The mixture immediately became opaque, creamy and viscous. However, within two minutes with continuous stirring, the mixture became translucent and almost clear. Water, 8.8 parts, was then added. The Gardner-Holdt viscosity within 10 minutes of mixing, at 25° C., was B. After one hour, the viscosity was C, after 4 hours D, after 1 day G, and after 3 days V. The solids content of this mixed and thinned coating composition was 24.3%.

Films were cast from the freshly prepared mixture of Part D on treated aluminum panels using a No. 12 Myer Bar. The films were baked at 121° C. for 2.5 minutes. The cured films were smooth, glossy and continuous in appearance, passed 7 methyl ethyl ketone (MEK) rubs, exhibited no blushing after 10 minutes immersion in a water bath heated at 82° C., and passed the wet adhesion test yielding a value of 100%. The wet adhesion test was conducted as follows: within one minute of removal from the water bath described above (blush resistance test), the film surface was dried with a cloth and scribed with a cross-hatch pattern. A high tack cellophane tape was applied over the scribed portion and was removed with a jerk. The amount of film which remained on the panel was visually estimated—100% being no removal and 0% total removal.

EXAMPLE 2

A series of blends was prepared from the aqueous solution described in Example 1—Part C and the diglycidyl ether of Bisphenol A, of Example 1 Part D and the identity of the solvent for the diglycidyl ether was varied. Thus, to 30 parts, of the solution of Example 1—Part C were added 4.4 parts of deionized water. When solution was attained, 3.1 parts of a solution of 87 parts of the diglycidyl ether of Bisphenol A in 13 parts of organic co-solvent as shown in Table I were then added with stirring. When homogeneity was attained, the blend was further diluted with 4.4 parts of deionized water. The solids content of each blend was 24.3%.

Films were then prepared from each of the blends on treated aluminum using a No. 12 Myer Bar and were baked for 2.5 minutes at 121° C. In Table I with reference to Blush Resistance, 10 is perfect, i.e., no blushing, and 0 is complete failure, i.e., the coatings are white and soft.

The appearance, and viscosity of the blends with the different organic solvents as a function of time are summarized in Table I as well as the properties of films prepared from each of the blends.

In the description of the blend appearance, Solution means that the blend was clear to the eye although it did exhibit the Tyndall light scattering effect. Colloidal Solution is used to describe a blend which appears somewhat hazy and opalescent. Colloidal Dispersion refers to an opaque blend exhibiting opalescence. Colloidal Solution/Dispersion describes a blend which has a degree of haziness or opaqueness between a colloidal solution and a colloidal dispersion.

EXAMPLE 3

To a suitable reactor were added 1200 parts of the epoxy-amine adduct solution described in Part B of Example 1. Heat and stirring were applied raising the temperature to 60°–70° C. Glacial acetic acid, 49.2 parts, (degree of salting 100%), was added rapidly and when the acid was thoroughly mixed in, deionized water, 2053.2 parts, was added slowly while maintaining the temperature at 70° C. The resulting solution had a solids content of 21.8%, a Gardner-Holdt viscosity at 25° C. of A₃ and a pH of 5.6.

To 50 parts of the above solution were added with stirring 4.5 parts of a solution of the diglycidyl ether of Bisphenol A, having an epoxide equivalent weight of 190, at 87% solids in ethylene glycol monobutyl ether. The mixture immediately became opaque, creamy and viscous. However, within about two minutes of continuous stirring, the mixture became translucent and then clear. The resulting microemulsion was further diluted with 6.4 parts of deionized water.

Using a No. 12 Myer Rod, films were prepared using the above microemulsion on panels of electrolytic tin plate (ETP), tin free steel (TFS), treated aluminum (TAL) and untreated aluminum (UAL).

Panels were baked for 2.5 minutes at 121° C. Additional coated panels were baked for 2.5 minutes at 177° C. The evaluation of the coatings was conducted in accordance with the tests shown in Table II and the results summarized therein. Tests 1 to 3 and 8 are conducted in accordance with Example 1.

70° C. and, with stirring, 97.31 parts of Bisphenol A were added followed by 0.41 part of triphenyl phosphine catalyst. Heating was continued raising the temperature to 130° C. The heat source was removed, and the temperature increased to 161° C. due to the exothermic reaction. Heating was resumed raising the temperature to 180° C. in 10 minutes. The temperature was held at 178°–180° C. for one hour. The heat source was removed and 250 parts of toluene were slowly added while allowing the temperature to drop to 70° C. At 70° C., 64 parts of ethylene diamine were added and the temperature was held at 70° C. for one hour. The temperature was then raised to 100° C. and was held at 100°–104° C. for one hour. The reactor was then fitted for distillation and heat was applied to distill the unreacted ethylene diamine and toluene. After 45 minutes, the pot temperature had reached 182° C. Vacuum, 28.5 inches Hg., was applied and heating at 180°–184° C. was continued for 15 minutes. The vacuum and heat source were removed, and with the temperature at 170° C., 88.74 parts of ethylene glycol monobutyl ether was

TABLE I

| | Appearance | | | | |
|---|---|---|---|---|---|
| Time after Mixing | Mono Butyl Ether of Ethylene Glycol ($\delta_p = 3.1$) | Mono Ethyl Ether of Ethylene Glycol ($\delta_p = 4.2$) | Diacetone Alcohol ($\delta_p = 4.0$) | n-Butanol ($\delta_p = 2.8$) | s-Butanol ($\delta_p = 2.8$) |
| | | Organic Co-solvent | | | |
| 1 hr | Solution | Colloidal Sol/Disp. | Colloidal Sol/Disp. | Solution | Solution |
| 1 day | Solution | Sediment | Sediment | Colloidal Solution | Colloidal Solution |
| 2 days | Colloidal Solution | Much Sediment | Two Layers | Cloudy Dispersion | Cloudy Dispersion |
| 7 days | Col Disp. | N/D | N/D | Col Disp. | Col Disp. |
| | | Viscosity, Gardner-Holdt at 25° C. | | | |
| 1 hr | G-H | A | A₁ | K | K |
| 1 day | O | E-F | F | T-U | P |
| 2 days | U | N/D | N/D | U | T |
| 7 days | A₃ | N/D | N/D | A₃ | A₃ |

N/D = Not determined.

| | Film Properties | | | | |
|---|---|---|---|---|---|
| | Mono Butyl Ether of Ethylene Glycol | Mono Ethyl Ether of Ethylene Glycol | Diacetone Alcohol | n-Butanol | s-Butanol |
| Appearance | Smooth, Glossy | Rough Ridges | Rough Ridges | Smooth, Glossy | Smooth, Glossy |
| Methyl Ethyl Ketone Rubs | 6 | 6 | 5 | 7 | 5 |
| Blush Resistance | 10 | 10 | 10 | 10 | 10 |
| Wet Adhesion | 100% | 100% | 100% | 100% | 100% |

TABLE II

| TEST NO. | | ETP | TFS | TA1 | UA1 |
|---|---|---|---|---|---|
| | Baked at 121° C. | | | | |
| 1 | MEK Rubs | 4 | 4 | 4 | 4 |
| 2 | Blush Resistance | 10 | 10 | 10 | 8-9 |
| 3 | Wet Adhesion | 100% | 95% | 100% | 100% |
| 4 | Pencil Hardness | H | 3H | 4H | 4H |
| 5 | Appearance | OK* | OK | OK | OK |
| | Baked at 177° C. | | | | |
| 6 | MEK Rubs | 29 | 22 | 22 | 37 |
| 7 | Blush Resistance | 10 | 10 | 10 | 10 |
| 8 | Wet Adhesion | 100% | 100% | 100% | 100% |
| 9 | Pencil Hardness | H | 3H | 4H | 4H |
| 10 | Appearance | OK | OK | OK | OK |

OK* means glossy smooth coatings uninterrupted by craters, pinholes or other discontinuities.

EXAMPLE 4

To a suitable reactor were added 202.73 parts of the diglycidyl ether of Bisphenol A having an epoxide equivalent weight of 190. The temperature was raised to added over a 20 minute period. At 130° C., 88.74 parts of n-butanol were added over a 30 minute period. The resulting epoxy-amine adduct solution had a solids content of 63.8%. The epoxy-amine adduct had an average molecular weight of about 2830, an amine nitrogen equivalent weight of 708 and an amine hydrogen equivalent weight of 472.

To 60 parts of the epoxy-amine adduct solution were added 3.14 parts of glacial acetic acid (degree of salting 100%) and 112.46 parts of deionized water. To 50 parts of this solution (having a pH of 5.4) were added 4.87 parts of a solution of the diglycidyl ether of Bisphenol A, having an epoxide equivalent weight of 190, at 87% solids, in ethylene glycol monobutyl ether. The mixture became opaque, creamy and viscous. However, within about two minutes of continuous stirring, the mixture became translucent and then clear. The resulting microemulsion was further diluted with 6.8 parts, by weight, of deionized water to bring the solids content to 24.5%, based on the weight of the microemulsion. The Gardner-Holdt viscosity at 25° C. within 10 minutes of mixing was A and the appearance was clear. After 3 days at room temperature, the viscosity was $A_3$ and the appearance was clear. After 4 days the viscosity and appearance were the same, $A_3$ and clear.

Using a No. 12 Myer Rod, films were prepared on different metal panels of the type employed in Example 3. Two sets of panels were made in accordance with Example 2, one set being baked at 121° C. for 2.5 minutes, the other at 177° C. for 2.5 minutes. The coated panels are tested as shown in Table III with tests 1–3 and 6–5 conducted in accordance with Example 1 and the results summarized therein.

TABLE III

| TEST NO. |  | ETP | TFS | TA1 | UA1 |
|---|---|---|---|---|---|
| Baked at 121° C. | | | | | |
| 1 | MEK Rubs | 14 | 11 | 14 | 14 |
| 2 | Blush Resistance | 10 | 10 | 10 | 8–9 |
| 3 | Wet Adhesion | 100% | 50% | 100% | 100% |
| 4 | Pencil Hardness | H | 3H | 4H | 4H |
| 5 | Appearance | OK | OK | OK | OK |
| Baked at 177° C. | | | | | |
| 6 | MEK Rubs | 46 | 38 | 48 | 50 |
| 7 | Blush Resistance | 10 | 10 | 10 | 10 |
| 8 | Wet Adhesion | 100% | 100% | 100% | 100% |
| 9 | Pencil Hardness | H | 3H | 4H | 4H |
| 10 | Appearance | OK | OK | OK | OK |

EXAMPLE 5

Part A

Using the same procedure as described in Example 1, Part A, 1621.6 parts of the diglycidyl ether of Bisphenol A having an epoxide equivalent weight of 190 were reacted with 778.4 parts of Bisphenol A using 3.28 parts of triphenyl phosphine as catalyst. The resulting higher molecular weight resin had an epoxide equivalent weight of 1414.

Part B

To a suitable reactor were added 600 parts of the resin described in Part A and 500 parts of toluene. Heat and stirring were applied to dissolve the resin. When solution was attained and with the temperature adjusted to 70° C., 128 parts of ethylene diamine were added. The temperature was held for 1 hour at 70° C., followed by 1 hour at 100° C. The reactor was then fitted for distillation, and the temperature was raised to 170° C., to distill the unreacted ethylene diamine and toluene. When the 170° C. temperature was reached, vacuum (28.5 inches Hg) was applied, the temperature was raised to 180° C. and was held at 180° C. for 15 minutes. The vacuum was released and the heating source was removed. Ethylene glycol monobutyl ether, 417.1 parts, was slowly added forming a 60% solids solution based on the total weight of the solution. The average molecular weight of the adduct was 2932, the amine nitrogen equivalent weight was 733 and the amine hydrogen equivalent weight was 489.

Part C

To 600 parts of the resin solution of Part B were added 58.9 parts of acetic acid (degree of salting 200%) and 992.5 parts of deionized water. The resulting solution had a solids content of 21.8% and a Gardner-Holdt viscosity at 25° C. of $A_2$. The pH was 4.6.

Part D

To 50 parts of the solution of Part C were added with stirring, 4.87 parts of a solution of the diglycidyl ether of Bisphenol A having an epoxide equivalent weight of 190, to 87% solids in ethylene glycol monobutyl ether. The mixture became opaque, creamy and viscous but cleared within 2 minutes of mixing. The microemulsion was diluted further with 6.8 parts of deionized water. The viscosity, Gardner-Holdt at 25° C., was B. After one day at room temperature, the microemulsion was clear and the viscosity was C-D. After 5 days, the microemulsion was still clear and the viscosity was L. After 13 days, the microemulsion remained clear and the viscosity was $Z_3$.

Example E

To 50 parts of the solution of Part C were added with stirring, 4.24 parts of the diglycidyl ether of Bisphenol A, having an epoxide equivalent weight of 190. The mixture became opaque, creamy and viscous. After about 5 minutes of mixing, the mixture cleared forming a microemulsion. After further dilution with 6.8 parts, by weight, of deionized water, the viscosity was A-B. After one day the viscosity was B, after five days M and after 13 days $Z_4$. The microemulsion remained clear.

EXAMPLE 6

Part B of Example 5 was repeated with the same reactants and procedure except that the epoxy-amine adduct after distillation was dissolved in 104.3 parts ethylene glycol monobutyl ether, 208.5 parts n-butanol and 104.3 parts methyl ethyl ketone. To 600 parts of this solution were added 58.9 parts of glacial acetic acid (degree of salting 200%) and 992.5 parts of deionized water. The resulting solution had a Gardner-Holdt viscosity at 25° C. of $A_1$, a solids content of 21.8% and a pH of 4.6.

Microemulsions were formed using 50 parts of the above solution and, in one instance, adding thereto 4.87 parts of a solution of the diglycidyl ether of Bisphenol A, having an epoxide equivalent weight of 190, at 87% solids in ethylene glycol monobutyl ether followed by 6.8 parts of deionized water (6A). In the other instance the microemulsion (6B) was formed by adding to 50 parts of the solution described in the first paragraph of this example, 4.24 parts of the same digylcidyl ether of Bisphenol A of Part 6A but without co-solvent, followed by 6.8 parts of deionized water. Microemulsion 6A had an initial viscosity of D-E, after one day F, after 5 days T and after 13 days $Z_3$. Microemulsion 6B had an initial viscosity of E-F, after one day H, after 5 days W, and after 13 days $Z_5$. Both microemulsions remained clear.

EXAMPLE 7

To a suitable reactor were added 600 parts of the higher molecular weight polyepoxide resin described in Part A of Example 5, and 500 parts of toluene. Heat and stirring were applied to dissolve the resin. When solution was attained, the temperature was adjusted to 70° C. and 128 parts of ethylene diamine were added. The temperature was held at 70° C. for one hour and then at 100° C. for 1 hour. The temperature was then raised to 70° C. to distill the toluene and unreacted ethylene diamine. The distillation was completed by vacuum distillation (28.5 inches Hg) at 170°–180° C. for 15 minutes. At the end of this period, vacuum was released and the molten epoxy-amine adduct resin having a weight average molecular weight of 2932, an amine nitrogen equivalent weight of 733 and an amine hydrogen equivalent weight of 489 was discharged into a suitable container.

A number of solutions were prepared at 60% solids, from 40 parts of the epoxy-amine adduct described above and 26.67 parts of various organic co-solvents as shown in Table IV. Aqueous solutions were prepared from these resin solutions by mixing 30 parts of the organic solutions with 1.47 parts of glacial acetic acid followed by 5.1 parts of deionized water. The amount of glacial acetic acid is sufficient to achieve a degree of salting of the epoxy-amine adduct of 100%. Aqueous solutions using sufficient glacial acetic acid to achieve a degree of salting of the adduct of 200% were also prepared from 30 parts of the epoxy-amine adduct solution, 2.95 parts of glacial acetic acid, and 49.62 parts of deionized water. The solution designation, solvent and degree of salting are shown at Table IV.

Each of the aqueous epoxy-amine adduct resin solutions, 30 parts, were blended with 2.92 parts of a solution of the diglycidyl ether of Bisphenol A, having an epoxide equivalent weight of 190, at 87% solids in ethylene glycol monobutyl ether by mixing vigorously until viscous and clear or for 2 minutes. Deionized water, 4.2 parts, was then added with vigorous stirring. The appearance and viscosity (Gardner-Holdt) of the blends initially and after various intervals at room temperature are shown in Table IV.

The viscosity measurements are represented by the letters not in parentheses and are Gardner-Holdt at 25° C. The designations in the parentheses represent the following: (Im)=immiscible—2 layers; (C)=a clear microemulsion which although clear to the eye gives a Tydall light beam effect; (CS)=colloidal solution, i.e., a translucent, slightly hazy solution appearance; (CD)—colloidal dispersion appearance, i.e., an opaque blend; (CS/CD)—a blend which has a degree of haziness and opaqueness between a colloidal solution and dispersion appearance; (D)=dispersion, i.e., very opaque system with no opalescence; (sep)=separated into two layers.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

TABLE IV

| Run No. | Co-Solvent | $\delta_p$ $(cal/cm^3)^{\frac{1}{2}}$ | Degree of Adduct Salting (%) | Immediate | 1 Day | 2 Days | 6 Days | 7 Days | 10 Days |
|---|---|---|---|---|---|---|---|---|---|
| 1 | ethylene glycol monomethyl ether | 4.5 | 100 | (Im) | | | | | |
| 2 | ethylene glycol monomethyl ether | 4.5 | 200 | (Im) | | | | | |
| 3 | ethylene glycol monoethyl ether | 4.2 | 100 | (Im) | | | | | |
| 4 | ethylene glycol monoethyl ether | 4.2 | 200 | (Im) | | | | | |
| 5 | propylene glycol mono-n-propyl ether | 2.9 | 100 | (CD) L | (CS) X | (C) $Z_5$ | (CS) $Z_6$ | (CS) $Z_6$ | (CD) E-F |
| 6 | propylene glycol mono-n-propyl ether | 2.9 | 200 | (CD) M | (C) O | (C) T-U | (C) $Z-Z_1$ | (C) $Z_2$ | (C) $Z_5$ |
| 7 | propylene glycol mono-n-butyl ether | 2.6 | 100 | (C) $Z_4$ | (CS) $Z_4$ | (CS) $Z_5$ | (CS) $Z_6$ | (CS) $Z_6$ | (CD) A |
| 8 | propylene glycol mono-n-butyl ether | 2.6 | 200 | (C) $Z_3$ | (C) $Z_3$ | (C) $Z_4$ | (C) $Z_6$ | (C) $Z_6$ | (C) $Z_6$ |
| 9 | propylene glycol monomethyl ether | 4.1 | 100 | (Im) | | | | | |
| 10 | propylene glycol monomethyl ether | 4.1 | 200 | (Im) | | | | | |
| 11 | diethylene glycol monobutyl ether | 3.4 | 100 | (CS) G-H | (C) J-K | (C) S | (C) $Z_3$ | (CS) $Z_3$ | (CS) $Z_3$ |
| 12 | diethylene glycol monobutyl ether | 3.4 | 200 | (CS) A | (C) A | (C) A-B | (C) C | (C) C | (C) E-F |
| 13 | diethylene glycol monoethyl ether | 4.2 | 100 | (Im) | | | | | |
| 14 | diethylene glycol monoethyl ether | 4.2 | 200 | (Im) | | | | | |
| 15 | diacetone alcohol | 4.0 | 100 | (Im) | | | | | |
| 16 | diacetone alcohol | 4.0 | 200 | (Im) | | | | | |
| 17 | ethylene glycol monobutyl ether | 3.1 | 100 | (C) E | (C) J | (C) X | (CS) $Z_6$ | (CS) $Z_6$ | (CD) $Z_6$ |
| 18 | ethylene glycol monobutyl ether | 3.1 | 200 | (C) B | (C) B-C | (C) E | (C) Q | (C) U | (C) Y-Z |
| 19 | 50 parts ethylene glycol monobutyl ether 50 parts n-butanol | 3.1 2.8 | 100 | (C) U | (C) $Z_2$ | (C) $Z_6$ | (CS/CD) $Z_6$ | (CD) $Z_6$ | (D) $A_4$ |
| 20 | 50 parts ethylene glycol monobutyl | | | | | | | | |

TABLE IV-continued

| | | | | | | | | | |
|---|---|---|---|---|---|---|---|---|---|
| | ether | 3.1 | | | | | | | |
| | 50 parts n-butanol | 2.8 | 200 | (C) R | (C) T-U | (C) W-X | (C) $Z_4$-$Z_5$ | (C) $Z_5$ | (C) $Z_6$ |
| 21 | methyl ethyl ketone | 4.4 | 100 | (CD) F | (D) W | — | (D) > $Z_6$ | D | Gel |
| 22 | methyl ethyl ketone | 4.4 | 200 | (CD) H | (D) D | — | Sep | | |
| 23 | methyl n-butyl ketone | 3.0 | 100 | (CS) $A_1$ | (CD) A-$A_1$ | — | (CD) B | Sep | |
| 24 | methyl n-butyl ketone | 3.0 | 200 | (CS) D | (D) N | — | (Sep) | | |

(Im) = immiscible (2 layers).
(C) = clear microemulsion which exhibits Tyndall beam effect.
(CS) = colloidal solution, i.e., translucent slightly hazy solution appearance.
(CD) = colloidal dispersion appearance, i.e., opaque dispersion with opalescence.
(CS/CD) = blend which has a degree of haziness and opaqueness between colloidal solution and colloidal dispersion.
(D) = dispersion, i.e., very opaque with no opalescence.
(Sep) = separated into two layers.

What is claimed is:

1. A two component resin coating system which when the components are mixed forms a thermosetting curable coating composition having the resin of the second component present in said mixture in the microemulsified state which comprises:

(A) as a first component, the solution of:

(1) an acid salt of a polyamine terminated polyepoxide adduct which is the reaction product of (a) a polyepoxide resin represented by the structural formula:

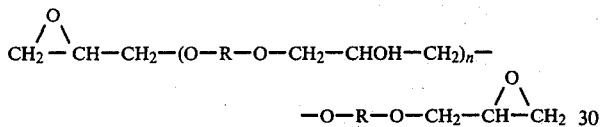

wherein R is a divalent hydrocarbon radical of a dihydric phenol and the average value of n is from 8 to 20 and (b) a polyamine having at least two amine nitrogen atoms per molecule, at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 290 to about 1000 and an amine nitrogen equivalent weight of about 360 to about 1500;

(2) at least one organic aliphatic hydroxyl containing co-solvent having a solubility parameter polar component between about 2.6 and about 3.9 $(cal/cm^3)^{\frac{1}{2}}$ present in an amount of from about 5 to about 45% by weight based on the weight of the polyepoxide-amine adduct and co-solvent; and (3) water in an amount sufficient to bring the solids content of the mixture to below 40% by weight, based on the weight of adduct, co-solvent and water and wherein said solution has a pH of about 4 to about 5;

(B) as a second component a polyepoxide cross-linker which is a glycidyl polyether of a polyhydric phenol having an epoxide equivalent weight of about 150 to about 500, said first component (A) and said second component (B) being present in the amounts to achieve an epoxide group to active hydrogen ratio of from about 0.25:1 to about 1.5:1 and wherein A and B are present in the weight ratio of about 3.5:1 to about 1:1.

2. The composition of claim 1 wherein R of the recurring structural formula is a divalent radical derived from p,p'-hydroxydiphenyl propane; the polyamine is an alkylene polyamine having the formula:

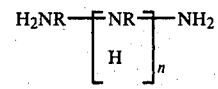

wherein n is an integer from 0 to 4 and R is an alkylene group containing 2 to 4 carbon atoms; the organic co-solvent is selected from the group consisting of alcohols and glycol ethers, and the polyepoxide resin crosslinker is derived from the reaction product of epichlorohydrin and p,p'-dihydroxydiphenyl propane.

3. The composition of claim 2 wherein the polyepoxide crosslinker has admixed therewith at least one organic co-solvent having a solubility parameter polar component between about 2.6 to about 3.9 $(cal/cm^3)^{\frac{1}{2}}$ in an amount of from about 5 to about 40%, by weight, based on the weight of co-solvent and crosslinker.

4. The composition of claim 2 wherein n of the recurring polyepoxide resin structural formula has an average value of from 8 to 12; the alkylene polyamine is an ethylene polyamine; the degree of salting of the adduct is from about 80 to about 300%; the pH of the solution is about 5; the active hydrogen amine equivalent weight of the adduct is from about 350 to about 650; the amine nitrogen equivalent weight of the adduct is from about 475 to about 1000; the co-solvent is selected from at least one member of the group consisting of t-butanol, n-propanol, n-butanol, ethylene glycol monopropylether, diethylene glycol monobutyl ether, ethylene glycol monobutylether, propylene glycol monopropyl ether and propylene glycol monobutyl ether, and the amount of the polyepoxide crosslinker is sufficient to achieve an epoxy to reactive adduct amine equivalent ratio of from about 0.25:1.0 to about 1.5:1.0.

5. The composition of claim 2 wherein the co-solvent is a mixture of at least one organic co-solvent having a boiling point greater than about 160° C. and at least one organic hydrocarbon co-solvent having a low boiling point less than about 160° C. and wherein the weight weighted averge of the solubility parameter polar components of the high and low boiling co-solvents is between about 2.8 to about 3.8 $(cal/cm^3)^{\frac{1}{2}}$.

6. The composition of claim 1 wherein the degree of salting of the polyamine terminated polyepoxide adduct is about 80% to about 300%.

7. The composition of claim 6 wherein the acid is a volatile organic acid.

8. The composition of claim 7 wherein the acid is acetic acid.

9. A process for preparing a curable thermosetting coating composition which comprises:

(A) intimately admixing;

(1) an acid salt of a polyamine terminated polyepoxide adduct which is the reaction product of (a) a polyepoxide resin represented by the structural formula:

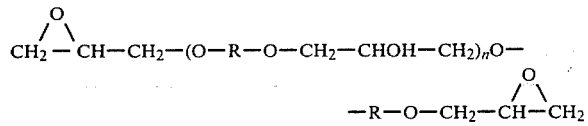

wherein R is a divalent hydrocarbon radical of a dihydric phenol and the advangtage value of n is 8 to 20; and (b) a polyamine having at least 2 amine nitrogen atoms per molecule at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 290 to about 1000 and an amine nitrogen equivalent weight of about 360 to about 1500;

(2) at least one organic aliphatic hydroxyl containing co-solvent having a solubility parameter polar component of from about 2.6 to about 3.9 $(cal/cm^3)^{\frac{1}{2}}$; and (3) water; to form a first component wherein the co-solvent is present therein in an amount of from about 5 to about 45% by weight, based on the weight of adduct and co-solvent, the water is present therein in an amount sufficient to achieve a solids content below 40% by weight, based on the weight of adduct co-solvent and water; and the pH of the mixture is about 4 to about 5; and (B) admixing with said first component a polyepoxide resin crosslinker which is a glycidyl polyether of a polyhydric phenol having an epoxide equivalent weight of about 150 to about 500, the amount of said cross-linker in the second component being sufficient to achieve an epoxy to adduct amine hydrogen ratio of from amount 0.25:1 to about 1.5:1, and wherein A and B are present in the weight ratio of about 3.5:1 to about 1:1, to form a final composition wherein the epoxy resin crosslinker is present therein in the microemulsified state.

(C) controlling the amount of water in the final composition in a manner sufficient to achieve a solids content in the final composition of from about 5 to about 40%, by weight, based on the weight of adduct, crosslinker, co-solvent and water.

10. The process of claim 9 wherein R of the recurring structural formula is a divalent radical derived from p,p'-dihydroxydiphenylpropane; the polyamine is an alkylene polyamine having the formula:

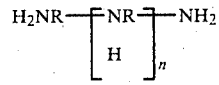

wherein n is an integer from 0 to 4 and R is an alkylene group containing 2 to 4 carbon atoms; the organic co-solvent is selected from the group consisting of alcohols and glycol ethers, and the polyepoxide resin crosslinker is derived from the reaction product of epichlorohydrin and p,p'-dihydroxydiphenylpropane.

11. The process of claim 9 wherein n of the recurring polyepoxide resin structural formula has an average value of from 8 to 12; the alkylene polyamine is an ethylene polyamine; the degree of salting of the adduct is from about 80 to about 300%, the pH is about 5, the amine hydrogen equivalent weight of the adduct is from about 350 to about 650; the amine nitrogen equivalent weight of the adduct is about 475 to about 1000; the co-solvent is selected from at least one member of the group consisting of t-butanol, n-propanol, n-butanol, ethylene glycol monopropyl ether, diethylene glycol monobutyl ether, ethylene glycol monobutyl ether, propylene glycol monopropyl ether and propylene glycol monobutyl ether and the amount of the polyepoxide crosslinker is sufficient to achieve an epoxy to adduct amine hydrogen equivalent ratio of from about 0.25:1.0 to about 1.5:1.0.

12. The process of claim 9 wherein the co-solvent is a mixture of at least one organic co-solvent having a high boiling point greater than about 160° C. and at least one organic hydrocarbon co-solvent having a low boiling point less than about 160° C., and wherein the weight weighted average of the solubility parameters polar components of the high and low boiling solvents is between about 2.8 and about 3.8 $(cal/cm^3)^{\frac{1}{2}}$.

13. The process of claim 9 wherein the thermosetting composition is cured at a temperature of about 150° to about 400° F. for a period of about 0.5 to about 8 minutes.

* * * * *